US009325552B2

(12) United States Patent
Walker et al.

(10) Patent No.: US 9,325,552 B2
(45) Date of Patent: Apr. 26, 2016

(54) EXTENDED DURATION CYCLIC PREFIX WITH LOW OVERHEAD FOR LTE BROADCAST

(71) Applicant: QUALCOMM Incorporated, San Diego, CA (US)

(72) Inventors: Gordon Kent Walker, Poway, CA (US); Xiaoxia Zhang, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 14/480,897

(22) Filed: Sep. 9, 2014

(65) Prior Publication Data
US 2015/0078292 A1     Mar. 19, 2015

Related U.S. Application Data

(60) Provisional application No. 61/877,864, filed on Sep. 13, 2013, provisional application No. 61/883,820, filed on Sep. 27, 2013.

(51) Int. Cl.
*H04L 27/26*     (2006.01)
*H04W 72/00*     (2009.01)
*H04L 5/00*     (2006.01)

(52) U.S. Cl.
CPC .......... *H04L 27/2607* (2013.01); *H04L 5/0037* (2013.01); *H04L 5/0069* (2013.01); *H04W 72/005* (2013.01)

(58) Field of Classification Search
CPC ........... H04W 27/2607; H04W 72/005; H04L 5/0037; H04L 5/0069
See application file for complete search history.

(56) References Cited

U.S. PATENT DOCUMENTS

| | | | | |
|---|---|---|---|---|
| 2006/0013325 A1* | 1/2006 | Agrawal | .............. | H04B 7/2656 375/260 |
| 2009/0122771 A1* | 5/2009 | Cai | ........................ | H04J 11/00 370/338 |
| 2010/0118806 A1* | 5/2010 | Griot | ................... | H04L 27/2607 370/329 |
| 2011/0122976 A1* | 5/2011 | Lei | ...................... | H04L 27/2607 375/340 |
| 2013/0022090 A1* | 1/2013 | Weng | ................ | H04L 25/03343 375/219 |
| 2013/0315321 A1* | 11/2013 | Rajagopal | ........... | H04L 27/2607 375/260 |

FOREIGN PATENT DOCUMENTS

WO     WO-2013116237 A1     8/2013

OTHER PUBLICATIONS

International Search Report and Written Opinion—PCT/US2014/054956—ISA/EPO—Dec. 15, 2014.

(Continued)

*Primary Examiner* — Albert T Chou
(74) *Attorney, Agent, or Firm* — Norton Rose Fulbright US LLP

(57) ABSTRACT

Extended duration cyclic prefixes with lower overhead are disclosed in which an integer multiple sequence of carriers above the nominal 300 carrier-per-25 resource blocks (RBs) definition are selected to reduce the cyclic prefix overhead below the normative 20%. Sets of durations are then provided associated with each such integer multiple sequence of carriers that allow for the combined duration of the symbol duration and extended duration cyclic prefix to result in an integer number of carriers for each RB.

26 Claims, 13 Drawing Sheets

(56) References Cited

OTHER PUBLICATIONS

Taylor S., "Changes to IEEE 802.16a/D3, Method for determining the Cyclic Prefix used by an AP C80216a-G2- 63", IEEE Draft; C80216A-32 63, IEEE-SA, Piscataway, NJ USA,—vol. 802.16a, May 16, 2002, pp. 1-4, XP017788390, [retrieved on May 16, 2002] Section 2.

* cited by examiner

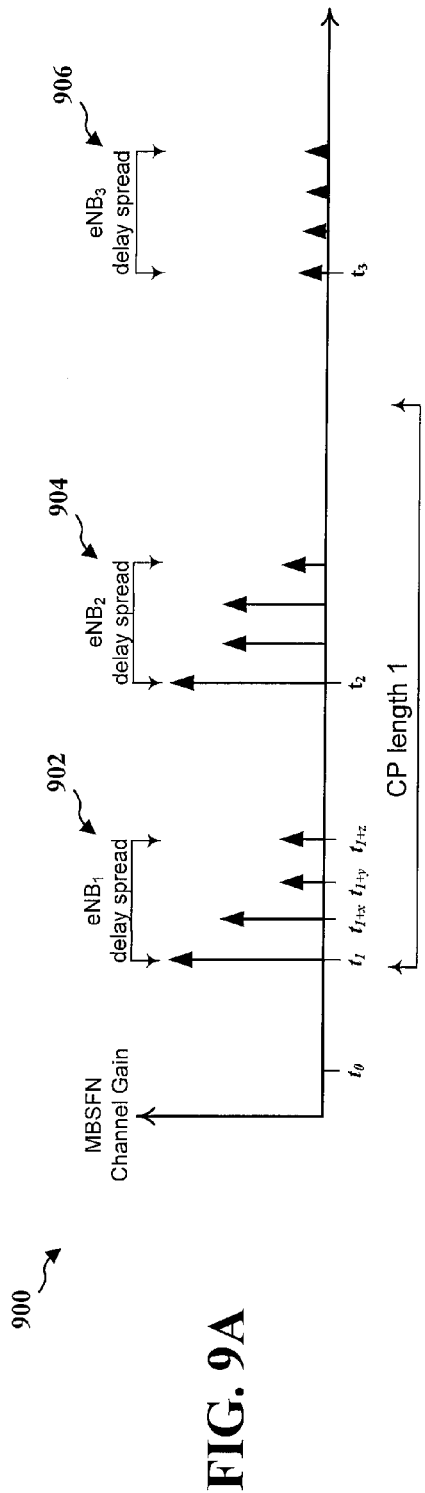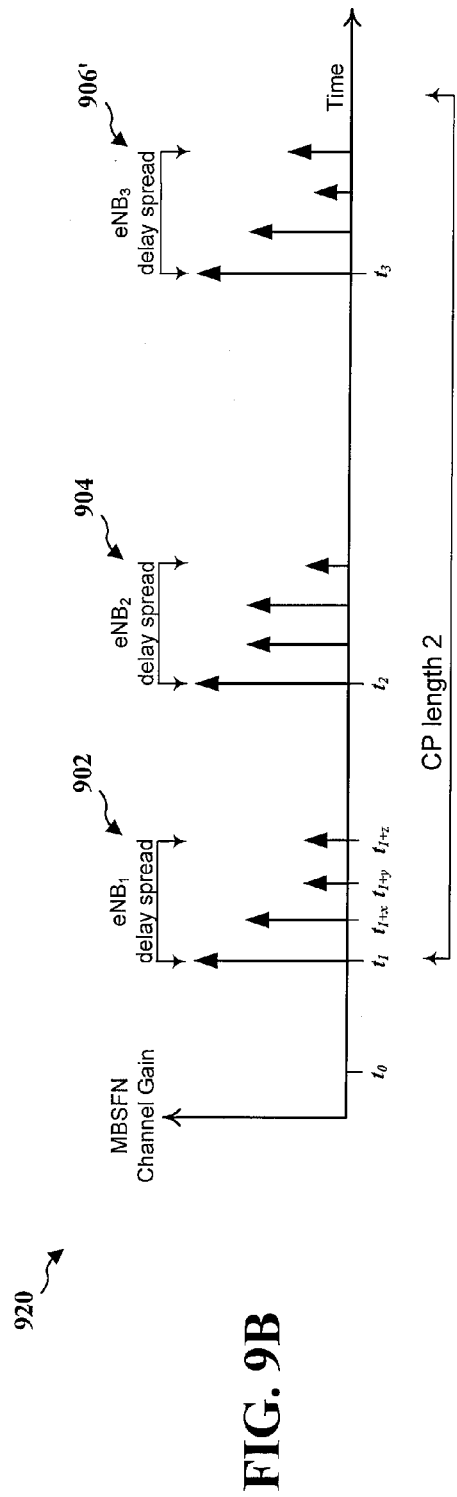
FIG. 9A
FIG. 9B

EXTENDED DURATION CYCLIC PREFIX WITH LOW OVERHEAD FOR LTE BROADCAST

CROSS-REFERENCE TO RELATED APPLICATIONS

This application claims the benefit of U.S. Provisional Patent Application No. 61/877,864, entitled, "EXTENDED DURATION CYCLIC PREFIX WITH LOW OVERHEAD FOR LTE BROADCAST", filed on Sep. 13, 2013, and U.S. Provisional Patent Application No. 61/883,820, entitled, "EXTENDED DURATION CYCLIC PREFIX WITH LOW OVERHEAD FOR LTE BROADCAST", filed on Sep. 27, 2013, which are expressly incorporated by reference herein in their entirety.

BACKGROUND

1. Field

Aspects of the present disclosure relate generally to wireless communication systems, and more particularly, to extended duration cyclic prefix with lower overhead for LTE broadcast.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In one aspect of the disclosure, a method of wireless communication includes selecting a cyclic prefix overhead for OFDMA symbols to be transmitted in a broadcast, wherein the cyclic prefix overhead is determined based on an integer multiple of a standard carriers-to-resource blocks (RBs) definition, selecting a cyclic prefix duration for the OFDMA symbols, wherein the cyclic prefix duration is determined to result in an integer number of carriers per RB based on the integer multiple of the standard carriers-to-RBs definition, and transmitting the OFDMA symbols using the cyclic prefix duration and cyclic prefix overhead.

In an additional aspect of the disclosure, an apparatus configured for wireless communication includes means for selecting a cyclic prefix overhead for OFDMA symbols to be transmitted in a broadcast, wherein the cyclic prefix overhead is determined based on an integer multiple of a standard carriers-to-RBs definition, means for selecting a cyclic prefix duration for the OFDMA symbols, wherein the cyclic prefix duration is determined to result in an integer number of carriers per RB based on the integer multiple of the standard carriers-to-RBs definition, and means for transmitting the OFDMA symbols using the cyclic prefix duration and cyclic prefix overhead.

In an additional aspect of the disclosure, a computer-readable medium having program code recorded thereon. This program code includes code to select a cyclic prefix overhead for OFDMA symbols to be transmitted in a broadcast, wherein the cyclic prefix overhead is determined based on an integer multiple of a standard carriers-to-RBs definition, code to select a cyclic prefix duration for the OFDMA symbols, wherein the cyclic prefix duration is determined to result in an integer number of carriers per RB based on the integer multiple of the standard carriers-to-RBs definition, and code to transmit the OFDMA symbols using the cyclic prefix duration and cyclic prefix overhead.

In an additional aspect of the disclosure, an apparatus includes at least one processor and a memory coupled to the processor. The processor is configured to select a cyclic prefix overhead for OFDMA symbols to be transmitted in a broadcast, wherein the cyclic prefix overhead is determined based on an integer multiple of a standard carriers-to-RBs definition, to select a cyclic prefix duration for the OFDMA symbols, wherein the cyclic prefix duration is determined to result in an integer number of carriers per RB based on the integer multiple of the standard carriers-to-RBs definition, and to transmit the OFDMA symbols using the cyclic prefix duration and cyclic prefix overhead.

The foregoing has outlined rather broadly the features and technical advantages of the present application in order that the detailed description that follows may be better understood. Additional features and advantages will be described hereinafter which form the subject of the claims. It should be appreciated by those skilled in the art that the conception and specific aspect disclosed may be readily utilized as a basis for modifying or designing other structures for carrying out the same purposes of the present application. It should also be realized by those skilled in the art that such equivalent constructions do not depart from the spirit and scope of the present application and the appended claims. The novel features which are believed to be characteristic of aspects, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present claims.

BRIEF DESCRIPTION OF THE DRAWINGS

FIGS. 9A and 9B are timing diagrams illustrating propagation delay spread for multiple eNBs in an MBSFN.

DETAILED DESCRIPTION

Figure 1A:
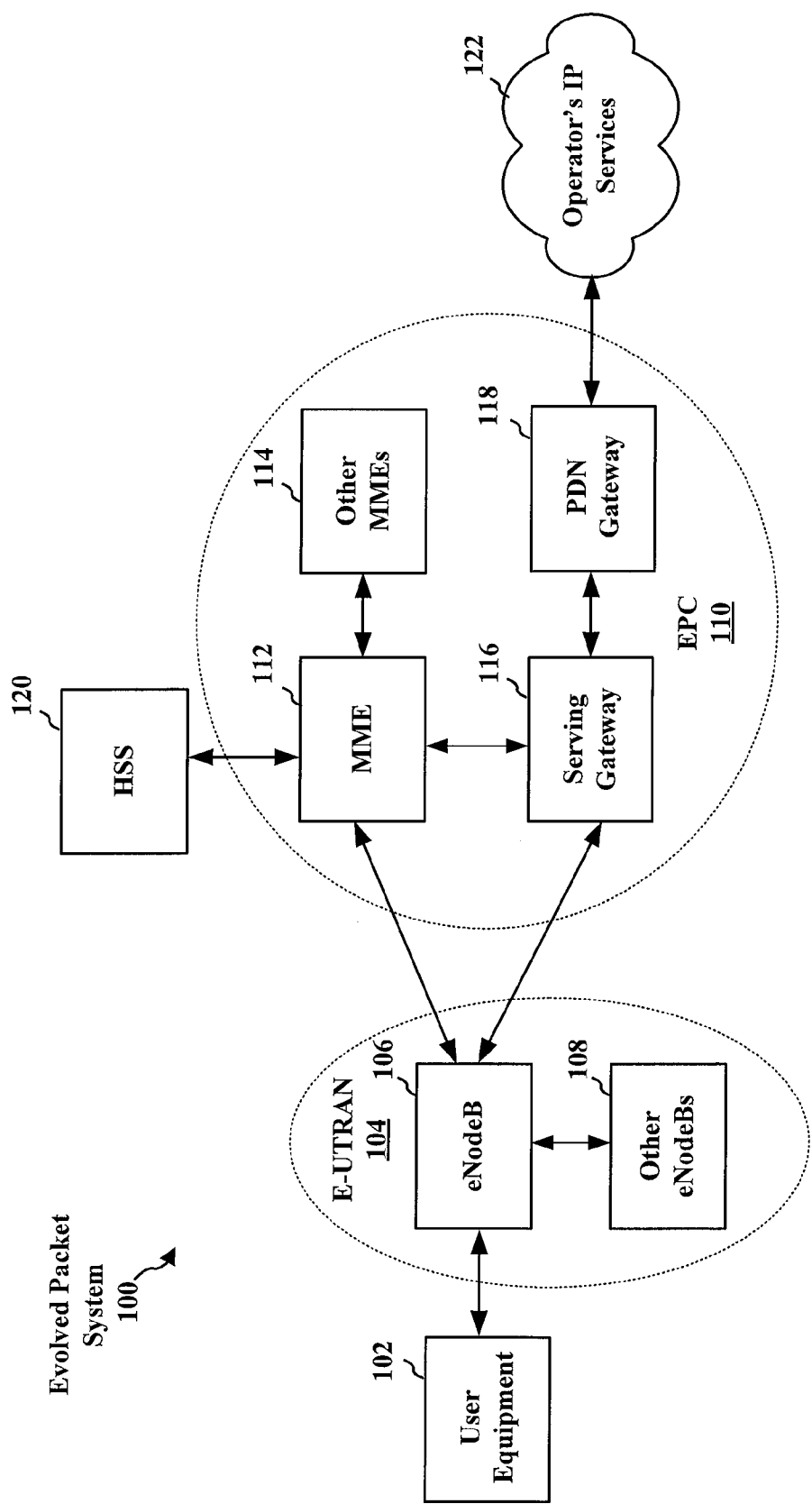
FIG. 1A is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1A is a diagram illustrating an LTE network architecture 100. The LTE network architecture 100 may be referred to as an Evolved Packet System (EPS) 100. The EPS 100 may include one or more UE 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the eNB 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS). In an MBMS radio access network, Broadcast/Multicast Service Center (BM-SC) 126 may serve as a portal or entry point for content providers and may provide certain authorization and other services. Broadcast/Multicast Management Entity (BME) 124 may be configured to receive, process, and/or forward control signaling, and may be used to select an eNB 106 or 108 to receive MBMS control signaling.

Figure 1B:
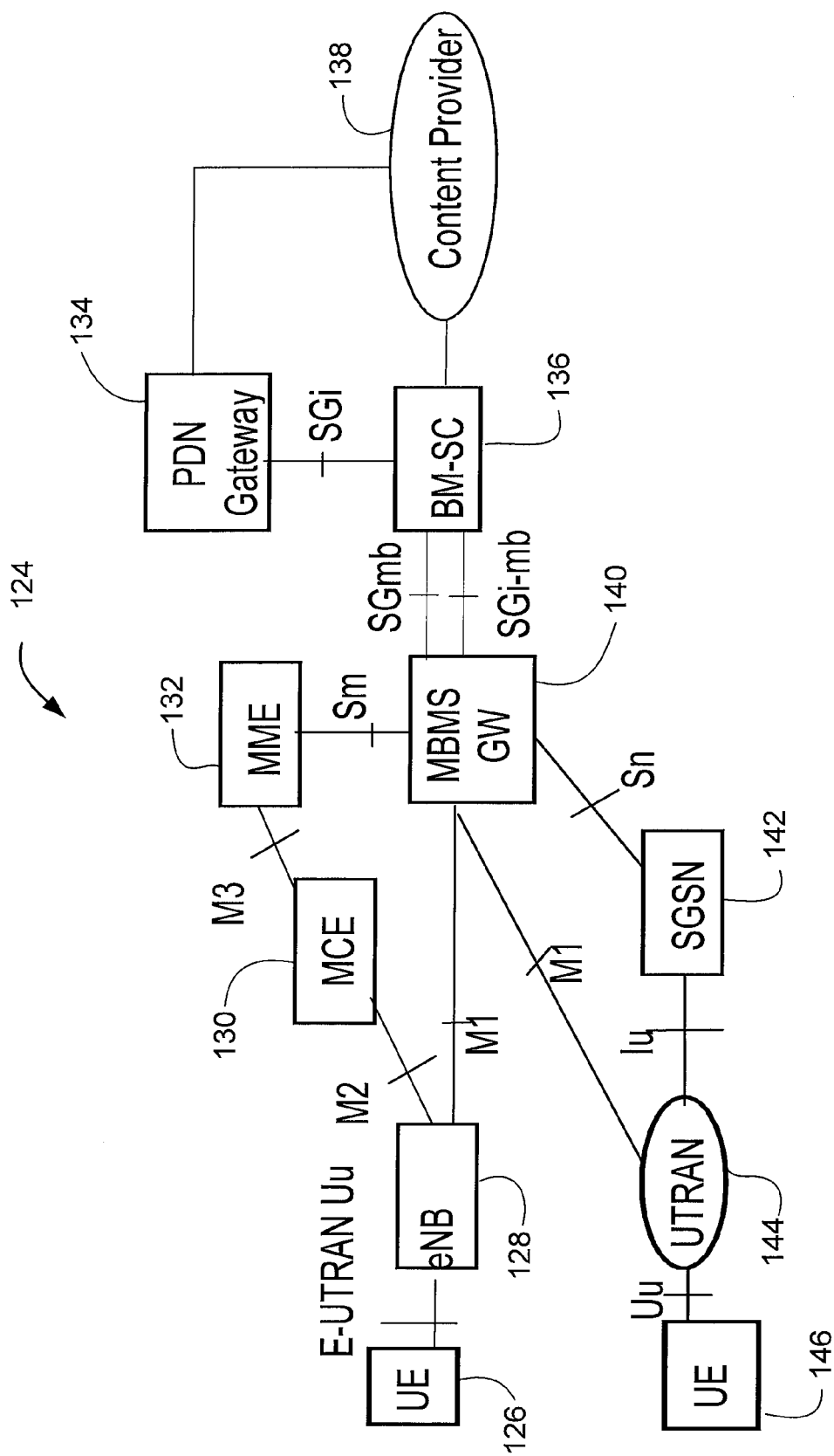
FIG. 1B illustrates functional entities of a wireless communication system for providing or supporting MBSFN service.

FIG. 1B illustrates functional entities of a wireless communication system 124 for providing or supporting MBSFN service. Regarding Quality of Service (QoS), the system 124 uses a Guaranteed Bit Rate (GBR) type MBMS bearer, wherein the Maximum Bit Rate (MBR) equals the GBR. These components are shown and described by way of example, and do not limit the inventive concepts described herein, which may be adopted to other architectures and functional distributions for delivering and controlling multicast transmissions.

The system 124 may include an MBMS Gate Way (MBMS GW) 140. The MBMS GW 140 controls Internet Protocol (IP) multicast distribution of MBMS user plane data to eNodeBs 128 via an M1 interface; one eNB 128 of many possible eNBs is shown. In addition, the MBMS GW controls IP multicast distribution of MBMS user plane data to UTRAN Radio Network Controllers (RNCs) 144 via an M1 interface; one UTRAN RNC 144 of many possible RNCs is shown. The M1 interface is associated to MBMS data (user plane) and makes use of IP for delivery of data packets. The eNB 128 may provide MBMS content to a user equipment (UE)/mobile entity 126 via an E-UTRAN Uu interface. The RNC 144 may provide MBMS content to a UE mobile entity 146 via a Uu interface. The MBMS GW 140 may further perform MBMS Session Control Signaling, for example MBMS session start and session stop, via the Mobility Management Entity (MME) 132 and Sm interface. The MBMS GW 140 may further provide an interface for entities using MBMS bearers through the SG-mb (user plane) reference point, and provide an interface for entities using MBMS bearers through the SGi-mb (control plane) reference point. The SG-mb Interface carries MBMS bearer service specific signaling. The SGi-mb interface is a user plane interface for MBMS data delivery. MBMS data delivery may be performed by IP unicast transmission, which may be a default mode, or by IP multicasting. The MBMS GW 140 may provide a control plane function for MBMS over UTRAN via a Serving General Packet Radio Service Support Node (SGSN) 142 and the Sn/Iu interfaces.

The system 124 may further include a Multicast Coordinating Entity (MCE) 130. The MCE 130 may perform an admission control function form MBMS content, and allocate time and frequency radio resources used by all eNBs in the MBSFN area for multi-cell MBMS transmissions using MBSFN operation. The MCE 130 may determine a radio configuration for an MBSFN Area, such as, for example, the modulation and coding scheme. The MCE 130 may schedules and control user plane transmission of MBMS content, and manage eMBMS service multiplexing, by determining which services are to be multiplexed in which Multicast Channel (MCH). The MCE 130 may participate in MBMS Session Control Signaling with the MME 132 through an M3 interface, and may provide a control plane interface M2 with the eNB 128.

The system 124 may further include a Broadcast-Multicast Service Center (BM-SC) 136 in communication with a content provider server 138. The BM-SC 136 may handle intake of multicast content from one or more sources such as the content provider 138, and provide other higher-level management functions as described below. These functions may include, for example, a membership function, including authorization and initiation of MBMS services for an identified UE. The BM-SC 136 may further perform MBMS session and transmission functions, scheduling of live broadcasts, and delivery, including MBMS and associated delivery functions. The BM-SC 140 may further provide service advertisement and description, such as advertising content available for multicast. A separate Packet Data Protocol (PDP) context may be used to carry control messages between UE and BM-SC. The BM-SC may further provide security functions such as key management, manage charging of content providers according to parameters such as data volume and QoS, provide content synchronization for MBMS in UTRAN and in E-UTRAN for broadcast mode, and provide header compression for MBSFN data in UTRAN. The BM-SC 136 may indicate session start, update and stop to the MBMS-GW 140 including session attributes such as QoS and MBMS service area.

The system 124 may further include a Multicast Management Entity (MME) 132 in communication with the MCE 130 and MBMS-GW 140. The MME 124 may provide a control plane function for MBMS over E-UTRAN. In addition, the MME may provide the eNB 128, 144 with multicast related information defined by the MBMS-GW 140. An Sm interface between the MME 132 and the MBMS-GW 140 may be used to carry MBMS control signaling, for example, session start and stop signals.

The system 124 may further include a Packet Data Network (PDN) Gate Way (GW) 134, sometimes abbreviated as a P-GW. The P-GW 134 may provide an Evolved Packet System (EPS) bearer between the UE 126 and BM-SC 136 for signaling and/or user data. As such, the P-GW may receive Uniform Resource Locator (URL) based requests originating from UEs in association with IP addresses assigned to the UEs. The BM-SC 136 may also be linked to one or more content providers via the P-GW 134, which may communicate with the BM-SC 136 via an IP interface.

Figure 2:
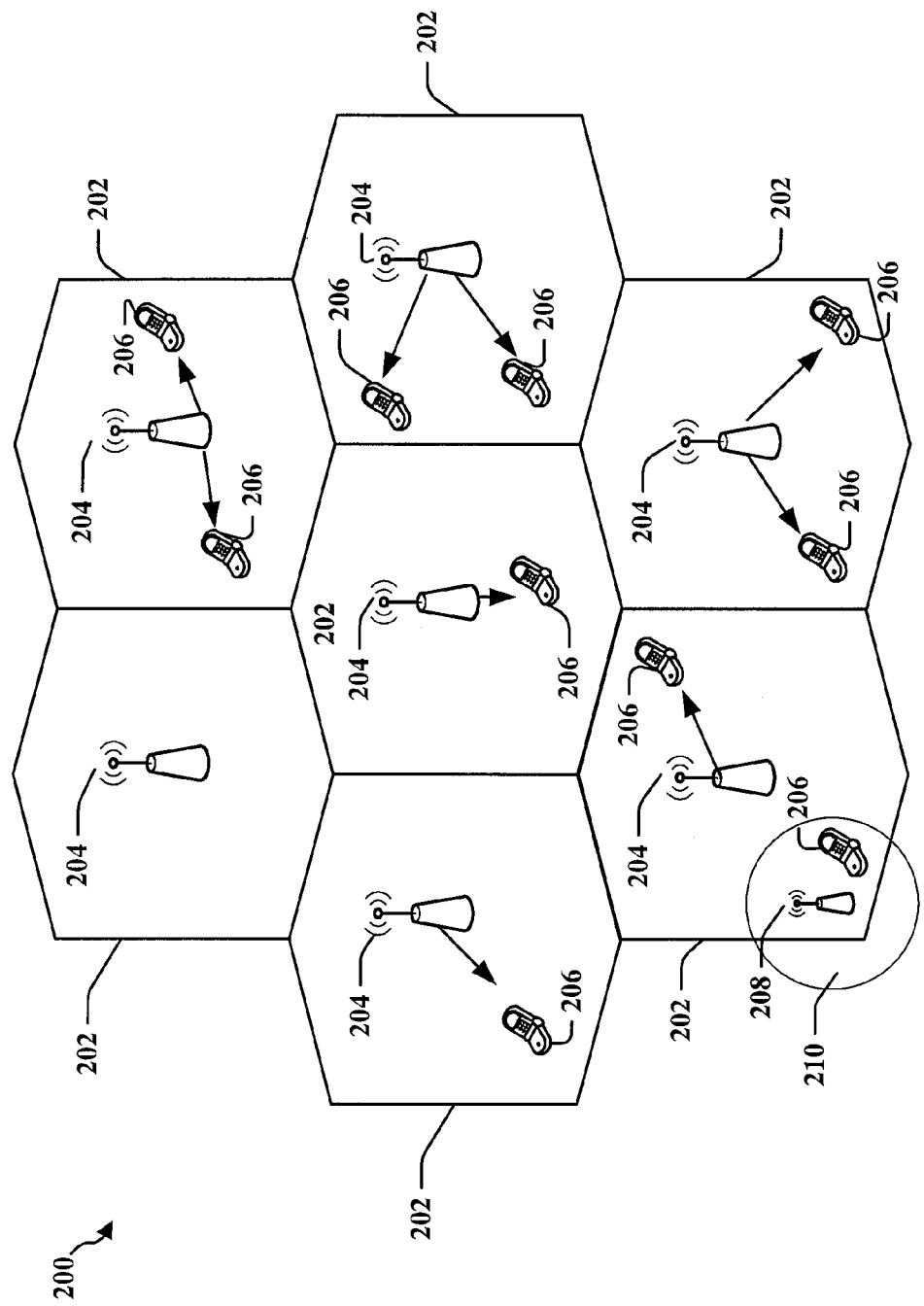
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDMA symbol. The subcarriers are spaced apart at precise frequencies. The spacing provides "orthogonality" that enables a receiver to recover the data from the subcarriers. In the time domain, a guard interval such as a CP may be added to each OFDMA symbol to combat inter-OFDM-symbol interference. The UL may use SC-FDMA in the form of a DFT-spread OFDM signal to compensate for high peak-to-average power ratio (PAPR).

Figure 3:
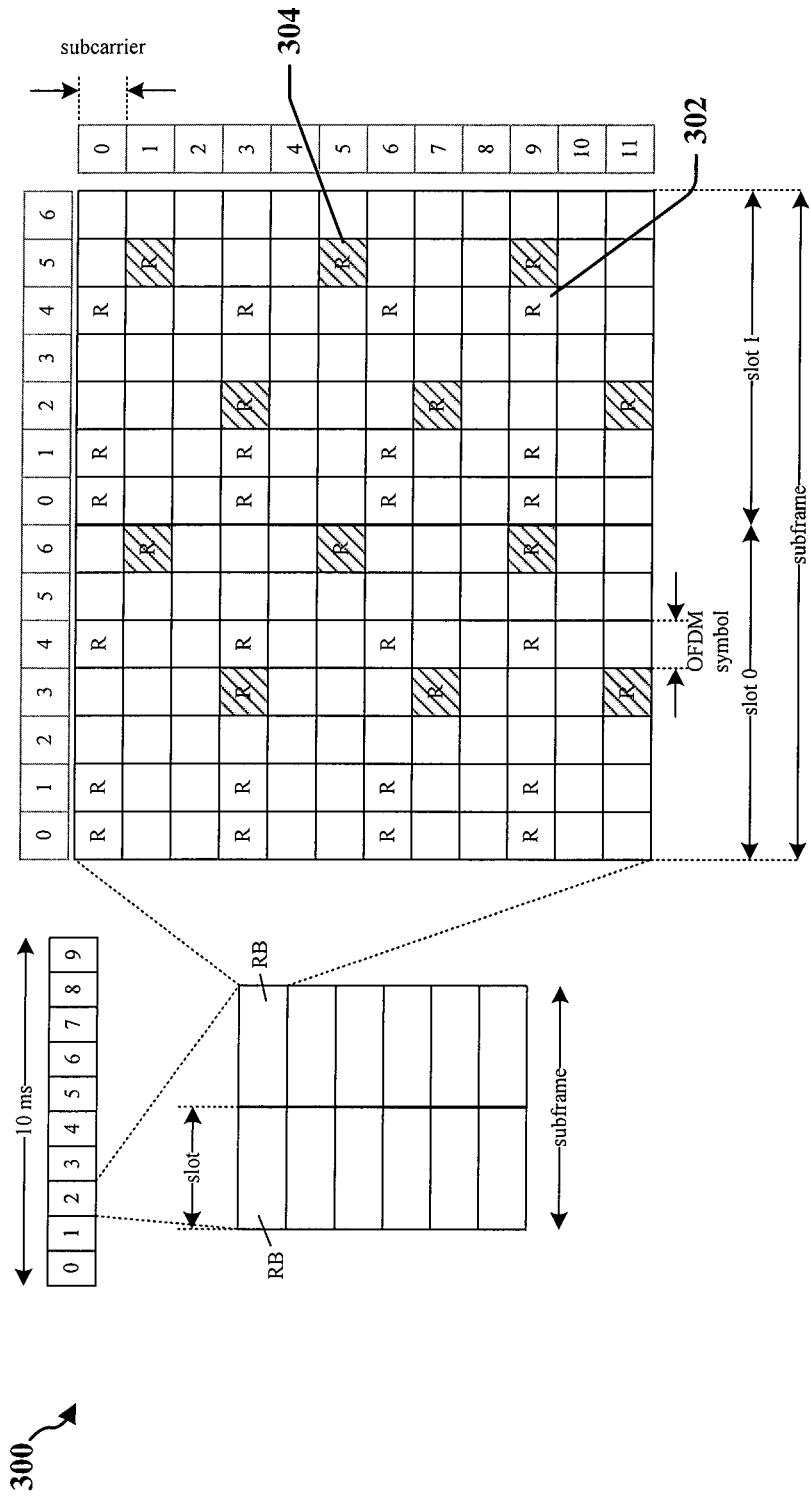
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal CP in each OFDMA symbol, 7 consecutive OFDMA symbols in the time domain, or 84 resource elements. For an extended CP, a resource block contains 6 consecutive OFDMA symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
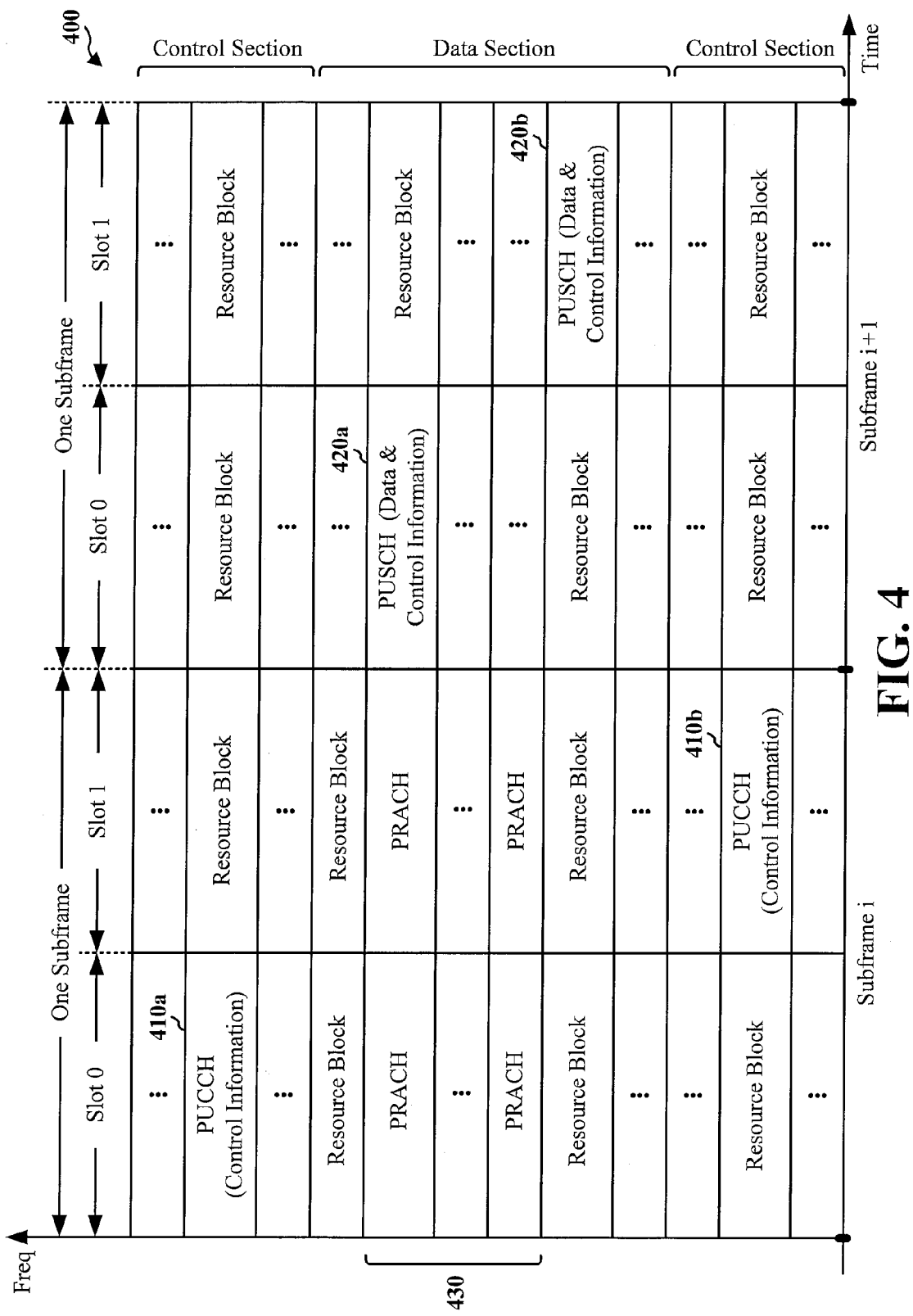
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
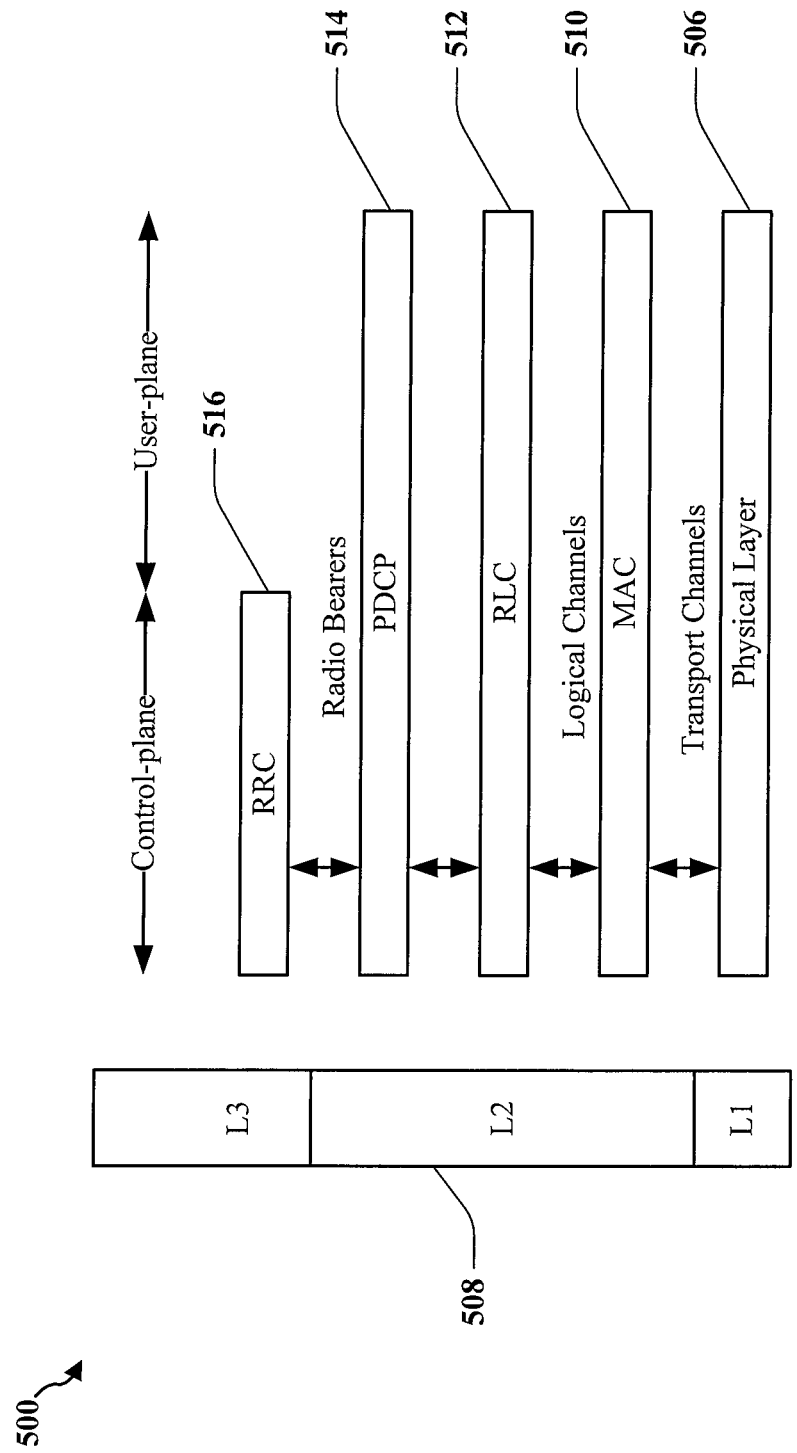
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
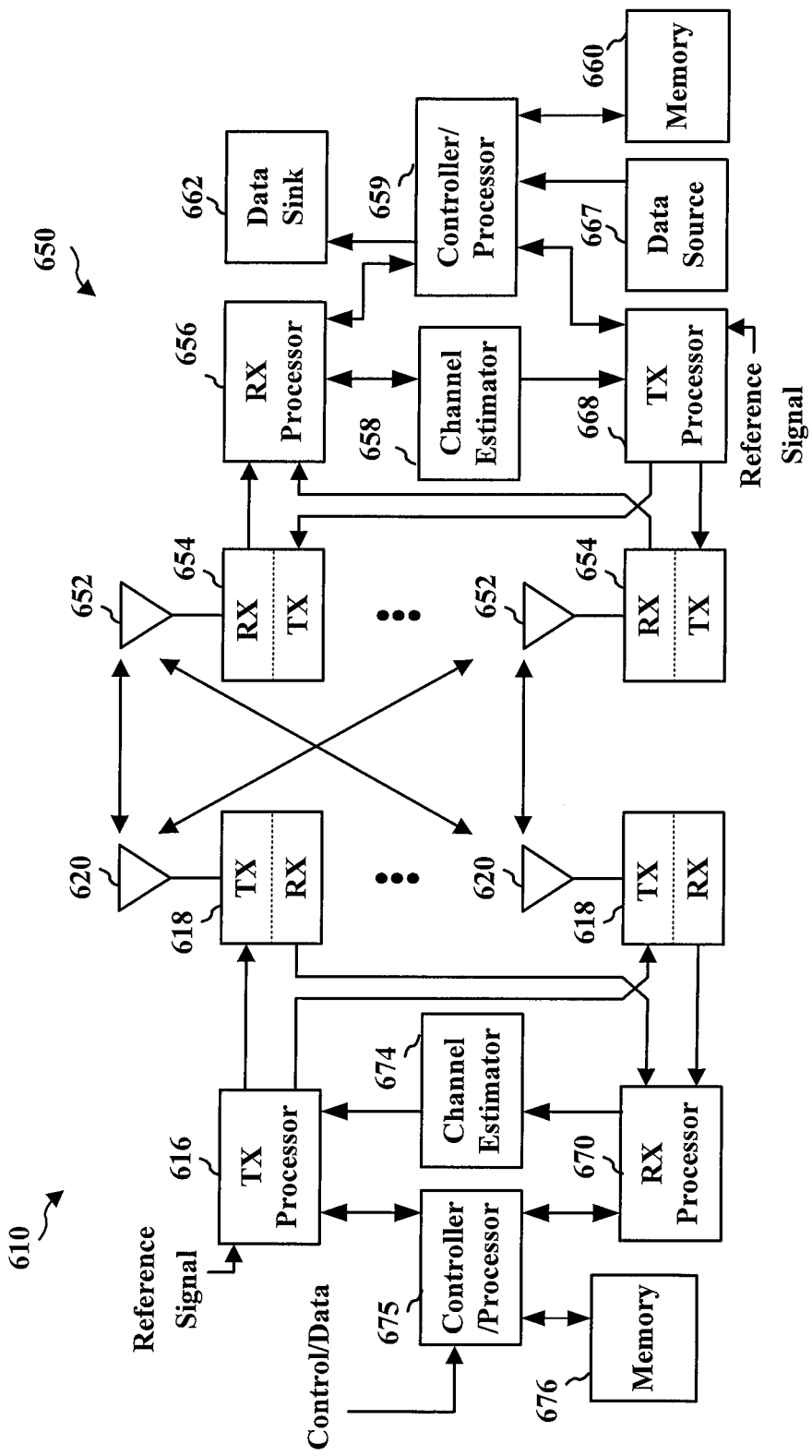
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDMA symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then provide to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDMA symbol stream. The RX processor 656 then converts the OFDMA symbol stream from the time-domain to the frequency domain using a Fast Fourier Transform (FFT). The frequency domain signal comprises a separate OFDMA symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
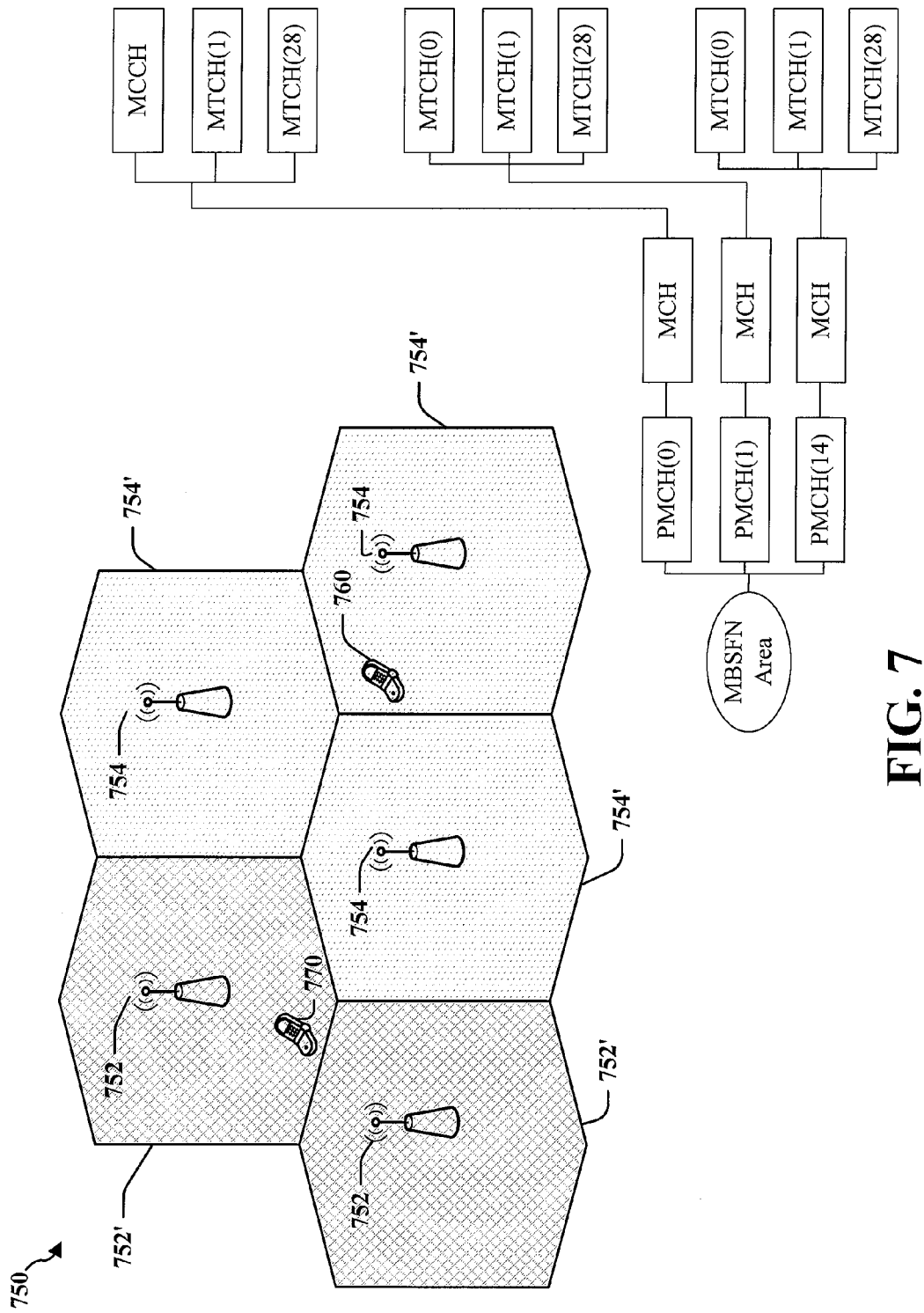
FIG. 7 is a diagram illustrating evolved Multicast Broadcast Multimedia Service in a Multi-Media Broadcast over a Single Frequency Network.

FIG. 7 is a diagram 750 illustrating evolved Multicast Broadcast Multimedia Service (eMBMS) in an MBSFN. The eNBs 752 in cells 752' may form a first MBSFN area and the eNBs 754 in cells 754' may form a second MBSFN area. The eNBs 752, 754 may be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data in a synchronized manner. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

Figure 8:
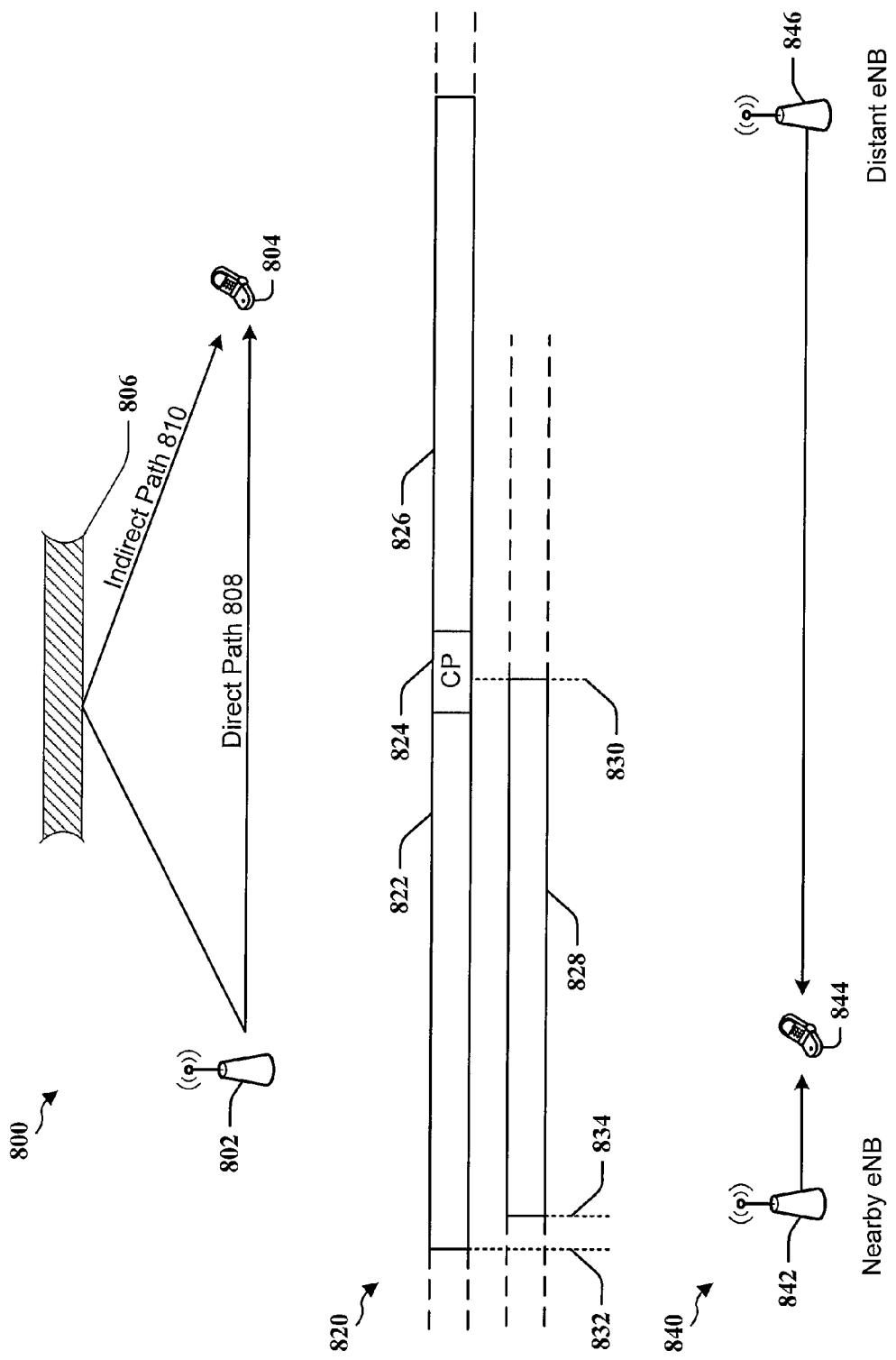
FIG. 8 is a diagram illustrating the propagation delay spread.

A CP is added to the beginning of OFDM symbols to provide a guard interval for suppressing inter-OFDM-symbol interference and to maintain orthogonality between subcarriers. Inter-symbol interference may occur because of time-dispersive channel issues caused by the existence of multiple communications paths within the channel between, for example, an eNB and a UE. FIG. 8 is diagram illustrating example scenarios 800 and 840 that may give rise to inter-symbol interference. FIG. 8 also includes a timing chart 820 illustrating the effect of propagation delays, as observed at UE 804. Example scenario 800 relates to a single eNB 802 that communicates with UE 804. A symbol 822 received at UE 804 from eNB 802 travels by a direct propagation path 808 and a delayed version of symbol 822 arrives as delayed symbol 828 from a longer, indirect propagation path 810 created, for example, by a reflection at object 806, which may be a building. If the difference in time of arrival 832 of symbol 822 and time of arrival 834 of delayed symbol 828 is less than the CP duration, then no inter-symbol interference occurs and symbols 822 and 828 may be combined at the UE 804. In the depicted example, the duration of CP 824 is long enough to prevent inter-symbol interference between delayed symbol 828, which ends at time 830, and next symbol 826. The difference between the time of arrival 832 of symbol 822 at UE 804 through direct path 808 and the time of arrival 834 of delayed symbol 828 at UE 804 may be referred to as the delay spread of scenario 800, particularly where indirect path 810 is the longest indirect propagation path available between eNB 802 and UE 804. An indirect path may have the longest propagation path length and/or delay associated with eNB 802 and UE 804.

Timing chart 820 may also be representative of an eMBMS scenario 840 in which eNB 842 and eNB 846 may be located at significantly different distances from UE 844 or may transmit along one or more propagation paths that have significantly different lengths. As a result, symbol 822 and delayed symbol 828, which are transmitted in a synchronous manner by eNBs 842 and 846 respectively, may arrive at different times at UE 844. As depicted in timing chart 820, inter-symbol interference may be averted if the end of delayed symbol 828 occurs during the duration of CP 824 of the next symbol 826 received at the UE 844. Symbols 822 and 828 arriving by different propagation paths may be combined at the UE 804 if the delay spread between the symbols 822 and 828 is less than the CP duration. The difference between the time of arrival 832 of symbol 822 at UE 844 by shortest propagation path (here, nearby eNB 842) and the time of arrival 834 of symbol 828 from distant eNB 846 at UE 844 may be referred to as the delay spread of eMBMS scenario 840. The delay spread for eMBMS scenario 840 is typically calculated using the arrival time 832 associated with the shortest propagation path length between an eNB 842 or 846 and UE 844, which may correspond to the direct path 808 from the closest eNB 842, and the arrival time 834 associated with the longest propagation path length between an eNB 842 or 846 and UE 844, which may correspond to the longest indirect path 810 in the MBSFN area, typically from the most distant eNB 846. The longest propagation path length may also be associated with an eNB 846 that is closer than a more distant eNB 846 when a longer indirect propagation path exists between closer eNB 842 and UE 844.

LTE defines an extended CP that may be used for eMBMS instead of a normal CP, particularly when an MBSFN area comprises large cells that produce correspondingly large delay spread. The duration of the extended CP may be 16.7 μs for LTE, whereas the duration of the normal CP may be 4.7 or 5.1 μs, for example. In eMBMS, the CP 824 may be required to cover timing differences of transmissions received from different eNBs 842, 846 in an MBSFN. A UE 844 in an MBSFN may receive signals from a nearby eNB 842 that has transmission power in the range of 10 to 40 watts and from a distant eNB 846 that has a higher transmission power, e.g. 80 kW or more, and has propagation path lengths to the UE 842 that are relatively long (e.g. lengths up to and beyond 20 kilometers (km)). A longer CP duration may be used to allow signals from both eNBs 842 and 846 to be combined and to avoid inter-symbol interference related longer propagation paths between UE 844 and distant eNBs 846 with high transmission power. In some embodiments, a CP duration may be used that is at least two or three times longer than the extended CP duration. CP duration as a percentage of the time required to transmit a symbol and the CP may be referred to as CP overhead. Some embodiments may increase symbol duration to compensate for effects of increased CP duration, which may include increased CP overhead.

In eMBMS, there may be multiple propagation paths between each eNB and a UE and the different eNBs in an MBSFN may have propagation delays that are different from one another and attributable to their respective distances from the UE. FIGS. 9A and 9B illustrate delay spreads in an MBSFN area in more detail. FIGS. 9A and 9B relate to an exemplary MBSFN area in which three eNBs transmit the same signal information to a UE in a synchronized manner, at a time $t_0$. As depicted in timing chart 900, multiple signals are received by a UE from each of the eNBs. A first group of signals 902 is received at the UE from a first eNB, with the first signal in group 902 arriving at time $t_1$, a second group of signals 904 is received at the UE from a second eNB, with the first signal in group 904 arriving at time $t_2$, and a third group of signals 906 is received from a third eNB, with the first signal in group 906 arriving at time $t_3$. The signals in each group 902, 904, and 906 may arrive at the UE at different times and the time elapsed between $t_0$ and the arrival of the first signal of each group 902, 904 and 906, $t_1$, $t_2$, and $t_3$ respectively, may represent the minimum propagation delay for the groups 902, 904 and 906. Minimum propagation delay may correspond to the shortest propagation path between an eNB and a UE.

Timing chart 900 further illustrates that the signal transmitted by each eNB may arrive at different times at the UE because of differences in the lengths of the propagation paths between each eNB and the UE. As shown for signal group 902, delayed versions of the signal may arrive at times $t_{1+x}$, $t_{1+y}$, and $t_{1+z}$. The time elapsed between $t_1$ and $t_{1+z}$ may represent the delay spread associated with the first eNB, corresponding to different propagation paths between the first eNB and the UE. Each propagation path between an eNB and a UE may have an attenuation that is the same or different from other propagation paths between the eNB and the UE.

As depicted, the first signal of group 902 is the first signal received by the UE ($t_1$). The UE may integrate or combine one or more signals received from one or more eNBs. Signals that are delayed with respect to time $t_1$ by less than the length of the duration of CP 1 may be combined at the UE. CP 1 is the CP defined for the MBSFN of FIG. 9A. Signals that are delayed for longer than the duration of CP 1 may cause inter-symbol interference. The signals in group 906 are shown as being attenuated to a level that is close to channel noise level and these attenuated signals may not cause significant inter-symbol interference or contribute significantly to MSFN gain as seen by the UE. Accordingly, CP 1 may have a duration that is less than the relative propagation delay between groups 902 and 906 (i.e. $t_3$-$t_1$) and consequently, the signals of group 906 may not be coherently combined with the signals received from the first and second eNBs at the UE.

Typically, attenuation increases with propagation path length. As shown in FIG. 9A, the signals of group 906 received from the third eNB have the longest propagation delays in the illustrated MBSFN and are also most attenuated. CP length may be configured to be less than a relative propagation delay of a signal received at the UE where the relative propagation delay corresponds to a propagation path length at which the attenuation of the signal is not expected to cause significant inter-symbol interference or contribute significantly to MSFN channel gain seen at the UE. For example, the signals of group 906 are significantly attenuated and can be excluded from coherent combination at the UE when CP 1 is used.

FIG. 9B illustrates the delay spreads and attenuation for the first, second, and third eNBs in which power level of the signals received from the third eNB (group 906') are comparable to the power levels of at least some signals in the groups 902 and 904, which are received from the first and second eNBs. This parity in received signal power may be the result of an increased transmitter power output from the third eNB relative to the power output of the first and second eNBs. The increased power of the signals in group 906' may cause significant inter-symbol interference when CP length is insufficiently long to cover the propagation delays of significant signals in group 906'. Consequently, a longer CP duration may be configured for the MBSFN (CP 2) to cover the propagation delays of the signals in group 906' received from the third eNB, and thereby permit the signals of group 906' to be coherently combined with the signals received from the first and second eNBs to provide MBSFN gain at the UE.

Specific broadcast use cases in various terrestrial broadcast systems, such as the Advanced Television Systems Committee (ATSC), may be served by a derivative form of LTE Broadcast/eMBMS. Depending on the specific conditions, these use cases may benefit from a cyclic prefix that is longer than those nominally available in the existing LTE specification, such as regular and extended cyclic prefixes.

The first use case considered provides a low power, low tower height, mobile, single frequency network (SFN) network. This use case defines a typical LTE Broadcast application, which may support tablets and smartphones, whether indoors, outdoors, or vehicular. Low power typically refers to a network that has transmitter sites in the range of 2 kW effective isotropic radiated power (EIRP) per 5 MHz. Low tower typically refers to a radiation height in the range of 30 m, and mobile typically refers to a network type that supports all classes of service for which the receiving antenna is not stationary. The applicable range of Doppler velocity is generally 3 km/hr to 200 km/hr for ATSC. The currently defined 16.66 and 33.33 μs cyclic prefixes should be sufficient in both mixed and dedicated carrier modes. This selection of cyclic prefixes may be duplicated in any standalone mode. This deployment style may also be suitable for indoor reception by nominally fixed receivers. The high Doppler rate is generally not required for this use case, however the low speed Doppler may be beneficial. The appropriate channel model for such reception is a multipath Rayleigh fading model. Indoor reception is likely dominated by close-in reflections in a temporal sense. Given that this use case is dominated by a Rayleigh fading dominated channel models, there may be significant efficiency gain possible due to the use of MIMO. The potential benefits of MIMO here depend on the deployment style of the network.

This deployment style is Single Frequency Network (SFN). Typically, the frequency reuse in such deployments is 100% and the bits per second (bps)/Hz of the deployment is less than or equal to two bps/Hz, although the selection of modulation coding scheme (MCS) may ultimately be determined by the site density and the total number of sites within a multicast broadcast multimedia service SFN (MBSFN) area. There are interference regions about the transition from one MBSFN to another that must be considered in the network design.

Another use case considered provides a medium power, high tower, mobile, SFN. Medium power typically refers to transmitter with a maximum radiated power of 50 kW effective radiated power (ERP), and high tower typically refers to a transmit radiation height above 200 m. This deployment style is a potential ATSC/LTE Broadcast application that may support tablets and smartphones, whether indoors, outdoors or in a vehicle. The applicable range of Doppler velocity may generally range from 3 km/hr to 200 km/hr. This deployment style is also potentially suitable for indoor reception by nominally fixed receivers. As with the low power, low tower height, mobile SFN, a high Doppler rate is generally not required for this use case, however the low speed Doppler may be beneficial. The appropriate channel model for such reception may also be a multipath Rayleigh fading model.

As currently defined, the LTE Broadcast physical layer has limitations for application to this use case, such that the existing cyclic prefixes may not be long enough to adequately guard against the long differential delays. The presence of high transmit towers in the network may lead to such long differential delays, in which cyclic prefixes of more than a 90 μs may be beneficial.

Another use case considered provides a high power, high tower, multi-frequency network (MFN), with roof top reception. Roof top reception generally refers to the receiving antenna being stationary and at a receiving height in the range of between 9 and 10 m. This type of deployment style is also a potential ATSC/LTE Broadcast application that supports roof top reception for consumption with nominally fixed receivers. The currently defined channel model is an additive white Gaussian noise (AWGN)-based model, although it is known that a Ricean model may also be useful for defining the appropriate channel in this use case. The duration of the channel for this style of deployment is typically less than 30 μs for the $99^{th}$ percentile reception locations. However, there are known cases of paths up to 100 μs. Because of these longer paths, there may be a need for cyclic prefix durations greater than 100 μs, in order to support this use case. This dimension of cyclic prefix may also support medium power SFN within the high power footprint, e.g., in geographically shadowed areas.

The ATSC target efficiency is currently defined at 4.2 bps/Hz at 15 dB carrier-to-noise (C/N) for AWGN channels. In order to achieve this level of capacity, the pilot overhead should be decreased, as compared to the mobile profile. This combination of high bps per Hz efficiency with relatively long cyclic prefix will also result in a larger fast Fourier transform (FFT) requirement.

It should be noted that the lack of time diversity in this use case may be treated by the use of Cyclic Delay Diversity (CDD) or other related methods, e.g., Space-Frequency Block Code (SFBC), although this is most effective for Rayleigh channels, which may be more likely to occur for indoor reception, which may also need to use more pilot energy. Thus, there may be a conflict between a maximum roof top reception efficiency and an indoor reception.

Another use case considered provides a low power, lower tower, SFN, roof top reception. This use case may not be nominally required within the context of ATSC, however, it may fall within the range of cyclic prefixes that might otherwise support other use cases. This use case is generally based on city/suburban coverage for indoor and vehicular handheld reception with a moderately dense deployment and roof top reception in a far more sparse rural deployment. Simulations have demonstrated that cyclic prefix durations up to 200 us may be beneficial for the rural reception use case.

As an SFN deployment style, wherein spectral reuse may approach 100%, the exact spectral reuse depends on the use of directional receive antennas with a sufficient front to back ratio in the rural border areas of the respective multicast-broadcast single frequency networks (MBSFNs). Interior areas of the SFN may utilize omni-directional antennas. An MBSFN transition within suburban areas may use similar considerations of interference as in the previous low power, low tower use case.

Some methods call for lengthening the total duration of the symbol, while otherwise leaving the general structure of LTE intact. This process may be reasonable as long as the cyclic prefix overhead remains 20% of the total duration. However, in order to achieve the transmission efficiencies that will be used with future broadcast systems, the cyclic prefix duration may need to grow while the overhead is reduced. Such aspects of the present disclosure may, therefore, employ revised numerology in both the time direction and frequency directions.

There are generally two approaches to defining extended duration cyclic prefixes: increasing the total duration of time allocated per symbol and growing the cyclic prefix proportionally; or committing a greater proportion of time to the cyclic prefix. While each approach extends the length of cyclic prefixes, committing the greater proportion of time to the cyclic prefix generally limits the maximum cyclic prefix duration.

The transmission structure of LTE is based on 1 ms sub-frames. Thus, the total duration of the symbol plus cyclic prefix can be adjusted relative to the subframe duration, which may be adjusted to allow for varying cyclic prefix durations. There are a number of potential numerologies that might be applied. Various aspects of the present disclosure select to constrain the total transmitted duration to be in an integer relationship with respect to the subframe, whether in a fractional sense or as a multiple, as this simplifies implementation.

If the resource block structure, e.g., 300 carriers within 25 RBs occupying 4.5 MHz, remains unchanged, the number of OFDM carriers per resource block will be proportional to the duration. See Table 1, below. The first two rows in Table 1 denote the already-required implementation for mixed or dedicated carrier modes. In Table 1, it is assumed that new format subframes are 100% LTE Broadcast for all added modes.

TABLE 1

| # | Number/ Subframe | Total Duration (msec) | Fraction CP (%) | CP Duration (usec) | Carrier Spacing (Hz) | FFT for 5 MHz | FFT for 6 MHz | FFT for 20 MHz |
|---|---|---|---|---|---|---|---|---|
| 1 | 12 | 0.08 | 20.0% | 16.67 | 15000 | 512 | 512 | 2048 |
| 2 | 6 | 0.17 | 20.0% | 33.33 | 7500 | 1024 | 1024 | 4096 |
| 3 | 3 | 0.33 | 20.0% | 66.67 | 3750 | 2048 | 2048 | 8096 |
| 4 | 2 | 0.50 | 20.0% | 100.00 | 2500 | 4096 | 4096 | 16384 |
| 5 | 1 1/2 | 0.67 | 20.0% | 133.33 | 1875 | 4096 | 4096 | 16384 |
| 6 | 1 | 1.00 | 20.0% | 200.00 | 1250 | 8192 | 8192 | 32468 |
| 7 | 1/2 | 2.00 | 20.0% | 400.00 | 625 | 16384 | 16384 | 65536 |

Figure 10:
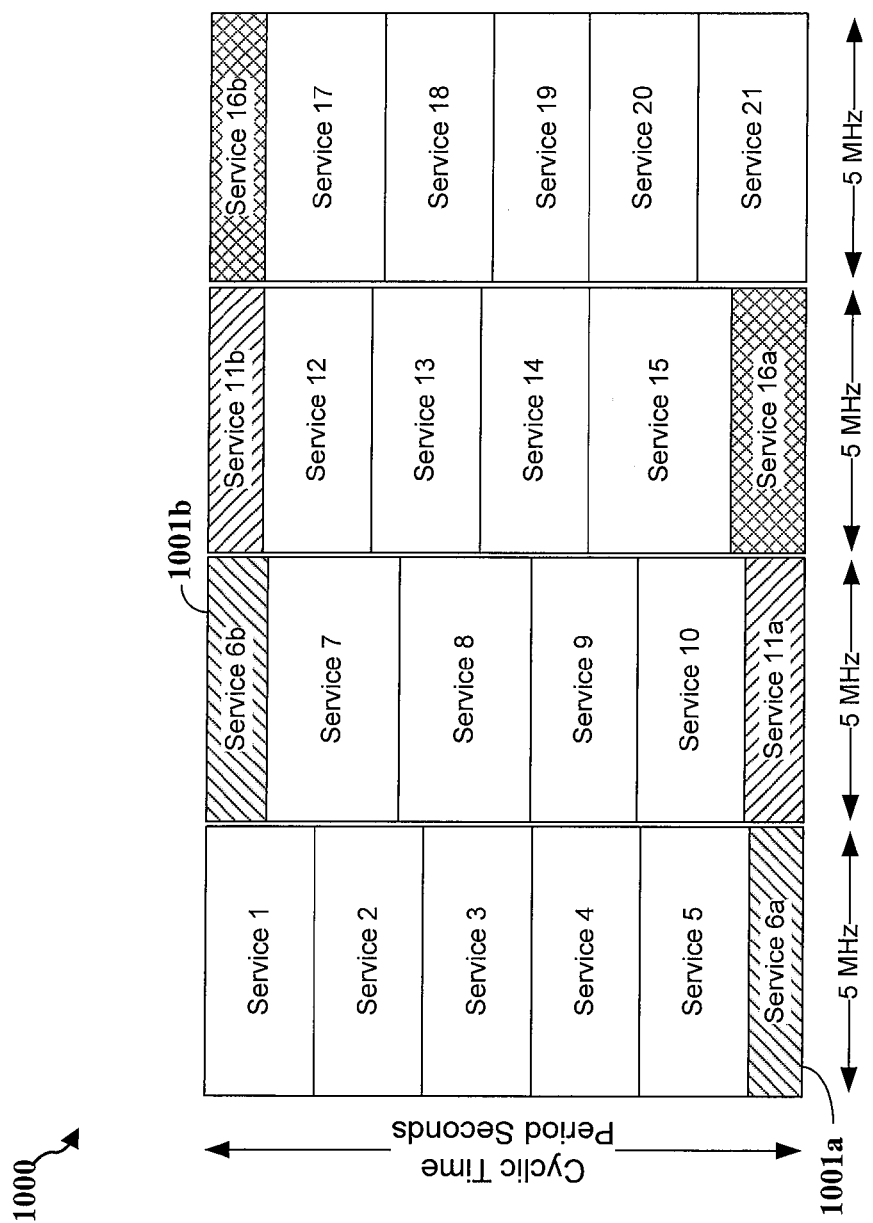
FIG. 10 is a block diagram illustrating a conceptual statistical multiplexing across time and frequency.

Table 1 indicates the FFT sizes for 5, 6, and 20 MHz. It is also possible to decode a wider, e.g., 20 MHz, allocation in a sequential manner. This minimizes the FFT size and the associated memory. However, it may also bind the peak bit rate and limit concurrency of decoding across multiple services within a given aggregated multiplex. FIG. 10 is a block diagram illustrating a conceptual statistical multiplexing 1000 across time and frequency. The N decoded services have to be non-blocking in the time domain. For example, the part of service 6a 1001 will not overlap in time with the other part of 6b 1002. This incremental decoding method for high bandwidth multiplexes may be a desirable solution for mobile services, as it limits the additional complexity in mobile devices, while enabling the medium power mobile and potentially low power, low tower roof top reception use cases.

The extended cyclic prefix mobile modes above impact complexity in the following manners. The supported total duration has been increased and some modes are fractional with respect to subframes. These aspects are included in signaling and the maximum FFT is increased. This is a direct consequence of the increases total duration of symbol time plus cyclic prefix. There are newly defined pilot patterns for each new total duration.

The current maximum bps/Hz supported for mobile applications is more than 3 bps/Hz. Achieving the highest possible bps/Hz efficiency, however, instructs the use of a fixed profile, which results in reduced pilot overhead and reduced cyclic prefix duration relative to the total duration, as compared to Table 1 above. These high efficiency fixed modes may not be receivable in mobile applications, due to the large transforms, and narrow carrier spacing. Narrow carrier spacing significantly limits the maximum Doppler rate supportable, without Inter Carrier Interference (ICI) cancelation. ICI substantially increases device complexity. Larger transforms also impact complexity. It may be preferable that mobile requirements be met without ICI or the use of larger fixed profile transforms.

Figure 11:
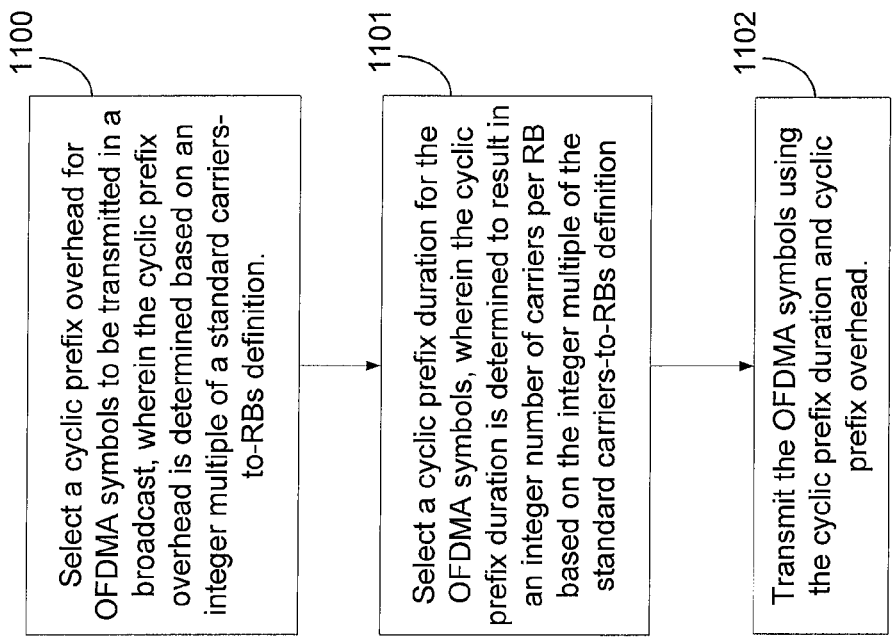
FIG. 11 is a functional block diagram illustrating example blocks executed to implement one aspect of the present disclosure.

FIG. 11 is a functional block diagram illustrating example blocks executed to implement one aspect of the present disclosure. At block 1100, a cyclic prefix overhead is selected for OFDMA symbols to be transmitted in a broadcast, wherein the cyclic prefix overhead is determined based on an integer multiple of a standard carriers-to-RBs definition. The broadcast may, for instance, be a multi-media broadcast. In selecting the integer multiple, the nominal 300 carrier-to-25 RBs definition is used. Integer multiples of the 300 carrier-to-25 RBs allows for variable cyclic prefix durations at a lower overhead than the normative 20% overhead in existing systems defined according to the 300 carrier-to-25 RBs definition. For example, specific combinations of carrier families, starting at 370 carrier and sequencing down by 5 carriers to 300 carriers, may beneficially provide a linear progression of cyclic prefix overhead percentages at an N×1.33% fractional rate, where N represents an integer multiple of the ratio of the selected combination, e.g., 370 to the normative 300 carriers.

At block 1101, a cyclic prefix duration is selected for the OFDMA symbols, wherein the cyclic prefix duration is determined to result in an integer number of carriers per RB based on the integer multiple of the standard carriers-to-RBs definition. Once the family of carriers relative to the normative 300 carriers-to-25 RBs has been selected, a sequence of cyclic prefix durations may be provided which allow for an integer number of carriers per RB considering the total duration of the cyclic prefix duration and the symbol duration. For example, with the selection of the family of 370 to 300 carriers, cyclic durations of 2.5, 5, and 10 ms may be provided which result in an integer number of carriers per RB.

At block 1102, the OFDMA symbols are transmitted using the cyclic prefix duration and cyclic prefix overhead.

Table 2 below illustrates a number of selections that can meet certain terrestrial broadcast system requirements for delay spread greater than 100 μs, with some margin. In order to achieve a low proportion of cyclic prefix, the number of carriers relative to the nominal 300 carriers per 25 RBs would increase. The complexity considerations for the fixed modes may be less constraining than for mobile, although it may still be desirable to keep the FFT at less than or equal to 32K.

TABLE 2

| Total Duration (msec) | Fraction CP | CP Duration (usec) | Carrier Spacing (Hz) | Ratio to RB | FFT 5 MHz | FFT 6 MHz | FFT 10 MHz |
|---|---|---|---|---|---|---|---|
| 2.50 | 1.33% | 33.33 | 405.41 | 370/300 | 16384 | 16384 | 32468 |
| 5.00 | 1.33% | 66.67 | 202.7 | 370/300 | 32468 | 65536 | 65536 |
| 10.00 | 1.33% | 133.33 | 101.4 | 370/300 | 65536 | 65536 | 131072 |
| 2.50 | 2.67% | 66.67 | 410.96 | 365/300 | 16384 | 16384 | 32468 |
| 5.00 | 2.67% | 133.33 | 205.5 | 365/300 | 32468 | 32468 | 65536 |
| 10.00 | 2.67% | 266.67 | 102.7 | 365/300 | 65536 | 65536 | 131072 |
| 2.50 | 4.00% | 100.00 | 416.67 | 360/300 | 16384 | 16384 | 32468 |
| 5.00 | 4.00% | 200.00 | 208.3 | 360/300 | 32468 | 32468 | 65536 |
| 10.00 | 4.00% | 400.00 | 104.2 | 360/300 | 65536 | 65536 | 131072 |

Of these potential configurations 2.5, 5 and 10 ms are potentially interesting total durations, because the numerology may work out to be integer numbers of carriers per RB. Table 3 below illustrates how the numerology above results in integer numbers of carriers per resource block. The number of carriers per RB may be calculated according to the equation:

$$\text{Number of Carriers per } RB = 180 \text{ kHz} \times \text{Total Duration} \times (1 - \text{Fractional } CP) \quad (1)$$

Where 180 kHz represents the bandwidth of an RB, Total Duration represents the total duration including symbol time plus cyclic prefix duration in seconds, and the fractional CP is a heuristically determined fraction selected to result in an integer number of carriers per RB for a number of various total durations.

TABLE 3

| Total Duration(msec) | Carriers/RB | Carriers/RB | Carriers/RB |
|---|---|---|---|
| 2.5 | 432 | 438 | 444 |
| 5 | 864 | 876 | 888 |
| 10 | 1728 | 1752 | 1776 |
| Ratio of Carriers to Nominal 20% CP Resource Block | 360/300 | 365/300 | 370/300 |

The family of solutions identified in Table 3 results from a fractional CP related to the series of fractions, N/75, where N is an integer (N=1, 2, 3, etc.).

Achieving higher capacity may also include increasing spectral occupancy beyond the nominal support of 25 resource blocks per 4.5 MHz. The integer relationship of carriers to resource blocks simplifies this process. Because each RB is 3.6% of 5 MHz, it may be reasonable to increase the total utilization by 7.2% to 97.2% by adding two additional resource blocks for a total of 27 RBs. Additional, new fixed profile Modulation Coding Schemes (MCS)s may be used to achieve more than 4 bps/Hz. Table 3 illustrates the supported bps/Hz and minimum additional white Gaussian noise (AWGN) C/N assuming a capacity achieving code.

By allocating and average of 6 pilots per RB for 2.5 ms, it is possible to achieve 1.37% total pilot power. Table 4 below shows the final allocation of resources to achieve target efficiency, other combinations are possible.

TABLE 4

|  | 27 RB | 25 RB | 27 RB | 25 RB | 27 RB | 25 RB | C/N* | Notes |
|---|---|---|---|---|---|---|---|---|
| Fraction CP | 1.33% | 1.33% | 2.67% | 2.67% | 4.00% | 4.00% | | |
| Pilot | 1.35% | 1.35% | 1.37% | 1.37% | 1.39% | 1.39% | | 6 per RB |
| Utilized Bandwidth | 97.2% | 90.0% | 97.2% | 90.0% | 97.2% | 90.0% | | 27 or 25 RBs |
| FEC | 25% | 20% | 25% | 20% | 25% | 20% | | Rate 3/4 or 4/5 |
| Data | 71.0% | 70.1% | 70.0% | 69.1% | 69.0% | 68.2% | | |
| Total bps/Hz | 6 | 6 | 6 | 6 | 6 | 6 | | for 64 QAM |
| Achieved bps Hz | 4.26 | 4.20 | 4.20 | 4.15 | 4.14 | 4.09 | | |

Table 4 illustrates MCS selection for fixed service at 5 MHz. These fixed profile carrier features impact the design of the following incremental manners. There is a need for revised baseband arm filters to allow for 27 RB baseband bandwidth. There are new pilot patterns for each total duration. There is revised numerology for each fractional cyclic prefix. The maximum required FFT has been further increased relative to the enhancements for mobile described above.

The family of solutions for fractional CP based on the denominator of 75 achieves integer carriers per RB for 2.5, 5, and 10 ms total durations. However, various aspects of the present disclosure may achieve integer carriers per RB for each integer ms in total duration between 1 and 10 ms. The integer carriers over this range of durations changes in steps of 0.5555%. Thus, providing greater flexibility than the family produced using the 75 denominator. The various aspects achieve this goal by modifying the fractional CP based on a fraction with a denominator of 180 (N/180), for any integer, N. It should be noted that selecting N=36 would achieve the nominal 20% fractional CP as illustrated with regard to Table 1, e.g., as defined in 16.66 μs and 33.33 μs total durations of Table 1.

Figure 12:
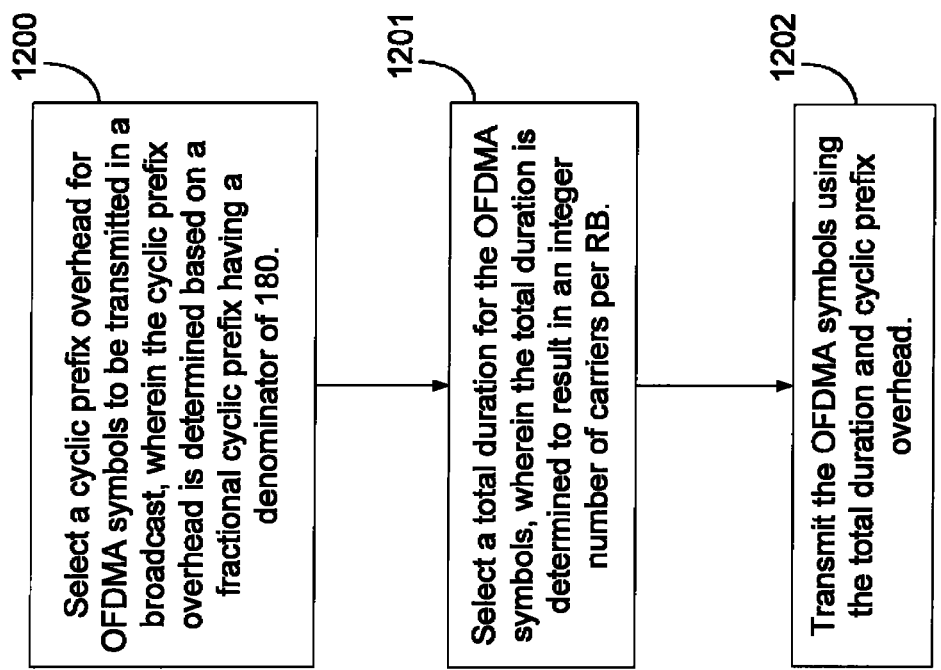
FIG. 12 is a functional block diagram illustrating example blocks executed to implement one aspect of the present disclosure.

FIG. 12 is a functional block diagram illustrating example blocks executed to implement one aspect of the present disclosure. At block 1200, a cyclic prefix overhead is selected for OFDMA symbols to be transmitted in a broadcast, wherein the cyclic prefix overhead is determined based on a fractional cyclic prefix having a denominator of 180. The specific fraction of the fractional CP for determining the cyclic prefix overhead may be selected by selecting the appropriate integer, N, multiple of the unitary fraction 1/180 (0.5555%).

At block 1201, a total duration is selected for the OFDMA symbols, wherein the total duration is determined to result in an integer number of carriers per RB. The total duration represents the sum of the symbol duration or time and the cyclic prefix duration. With LTE transmission structure based on 1 ms subframes, any total integer duration of 1 ms-10 ms may be selected and still achieve a desired integer number of carriers per RB.

At block 1202, the OFDMA symbols are transmitted using the total duration and cyclic prefix overhead.

It should be noted that the broadcast may be a standard system broadcast, or it may also by a multi-media broadcast. The present disclosure is not limited to a particular type of broadcast for the cyclic prefix overhead transmission.

Table 5 illustrates the per RB carrier count resulting from various aspects of the present disclosure utilizing the family of solutions driven by the integer multiple of the 1/180 fraction according to Equation (1).

TABLE 5

| Total Duration (ms) | N | Fractional CP | Carrier per RB | Total Duration (ms) | N | Fractional CP | Carrier per RB |
|---|---|---|---|---|---|---|---|
| 1 | 1 | 0.56% | 179 | 1 | 3 | 1.67% | 177 |
| 2 | 1 | 0.56% | 358 | 2 | 3 | 1.67% | 354 |
| 3 | 1 | 0.56% | 537 | 3 | 3 | 1.67% | 531 |
| 4 | 1 | 0.56% | 716 | 4 | 3 | 1.67% | 708 |
| 5 | 1 | 0.56% | 895 | 5 | 3 | 1.67% | 885 |
| 6 | 1 | 0.56% | 1074 | 6 | 3 | 1.67% | 1062 |
| 7 | 1 | 0.56% | 1253 | 7 | 3 | 1.67% | 1239 |
| 8 | 1 | 0.56% | 1432 | 8 | 3 | 1.67% | 1416 |
| 9 | 1 | 0.56% | 1611 | 9 | 3 | 1.67% | 1593 |
| 10 | 1 | 0.56% | 1790 | 10 | 3 | 1.67% | 1770 |
| 1 | 2 | 1.11% | 178 | 1 | 4 | 2.22% | 176 |
| 2 | 2 | 1.11% | 356 | 2 | 4 | 2.22% | 352 |
| 3 | 2 | 1.11% | 534 | 3 | 4 | 2.22% | 528 |
| 4 | 2 | 1.11% | 712 | 4 | 4 | 2.22% | 704 |
| 5 | 2 | 1.11% | 890 | 5 | 4 | 2.22% | 880 |
| 6 | 2 | 1.11% | 1068 | 6 | 4 | 2.22% | 1056 |
| 7 | 2 | 1.11% | 1246 | 7 | 4 | 2.22% | 1232 |
| 8 | 2 | 1.11% | 1424 | 8 | 4 | 2.22% | 1408 |
| 9 | 2 | 1.11% | 1602 | 9 | 4 | 2.22% | 1584 |
| 10 | 2 | 1.11% | 1780 | 10 | 4 | 2.22% | 1760 |

In selected aspects, the use of 256 quadrature amplitude modulation (QAM) may be adopted for unicast transmission in LTE. This would open up an opportunity to utilize 256 QAM for LTE Broadcast applications. The availability of 256 QAM may not, however, provide any material benefit with respect to meeting a high bps/Hz requirement at 15 dB C/N, because 15 dB may be too low to be efficiently utilized. The introduction of 256 QAM in the LTE device infrastructure may, however, be beneficial from the perspective that the signal to noise limit imposed by the ADCs utilized in the device may have to improve significantly. LTE Broadcast will benefit from the presence of 256 QAM unicast independent of whether 256 QAM modes are adopted for LTE Broadcast. Support for 256 QAM LTE Broadcast modes may be possible based on the numerology described above for 64 QAM.

The existing primary synchronization signal (PSS)/secondary synchronization signal (SSS)/physical broadcast channel (PBCH)/system information block (SIB) transmission format may be sufficient to describe the added physical layers features. Only one SIB may be needed to carry all such information. Semi-static SIB scheduling linked to transmit band may be applied. In the use cases discussed here either 5 or 6 MHz, although each frequency segment should describe the traffic in all frequency segments of the multiplex. Different MBSFN areas may support different cyclic prefix lengths and such information is indicated in SIB Different subframe structure is introduced for each different cyclic prefix length.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and process steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage medium may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, non-transitory connections may properly be included within the definition of computer-readable medium. For example, if the instructions are transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   selecting a cyclic prefix overhead for orthogonal division multiple access (OFDMA) symbols to be transmitted in a broadcast, wherein the cyclic prefix overhead is determined based on an integer multiple of a standard carriers-to-resource blocks (RBs) definition, wherein the integer multiple comprises a number of carriers selected to result in an integer number of carriers relative to 300 carriers per 25 RBs;
   selecting a cyclic prefix duration for the OFDMA symbols, wherein the cyclic prefix duration is determined to result in an integer number of carriers per RB based on the integer multiple of the standard carriers-to-RBs definition, and wherein the selected number of carriers allows for the cyclic prefix duration to vary according to the number of carriers selected; and
   transmitting the OFDMA symbols using the cyclic prefix duration and cyclic prefix overhead.

2. The method of claim 1, wherein the integer multiple of the standard carriers-to-RBs definition is determined based on a fractional cyclic prefix having a denominator of 180.

3. The method of claim 2, wherein the integer number of carriers per RB is determined according to the formula:
   number of carriers per RB=180,000 (Hz)×total duration (s) (1−fractional cyclic prefix), where 180,000 (Hz) represents bandwidth of a RB, and the total duration (in seconds) represents a sum of an OFDMA symbol time and the cyclic prefix duration.

4. The method of claim 2, wherein the fractional cyclic prefix is determined according to the formula:
   fractional cyclic prefix=$N$/180, where $N$ represents an integer value.

5. The method of claim 2, wherein the selecting the total duration comprises:
   selecting a desired duration including a symbol duration and one of plurality of cyclic prefix durations, wherein the selected desired duration results in the integer number of carriers per RB.

6. The method of claim 2, wherein the total duration includes 1, 2, 3, 4, 5, 6, 7, 8, 9, and 10 ms.

7. The method of claim 1, wherein the selecting the cyclic prefix duration comprises:
   selecting a desired duration including a symbol duration and one of plurality of cyclic prefix durations, wherein the selected desired duration results in the integer number of carriers per RB.

8. The method of claim 7, wherein each of the plurality of cyclic prefix durations maintains the selected cyclic prefix overhead.

9. The method of claim 8, wherein the plurality of cyclic prefix durations includes durations of 2.5, 5, and 10 ms, which result in the integer number of carriers per RB.

10. The method of claim 1, wherein the integer multiple of the standard carriers-to-RBs definition for a higher number of carriers-to-RBs results in a lower cyclic prefix overhead.

11. The method of claim 1, wherein the integer multiple comprises a sequence of carriers between 370 carriers and 300 carriers, wherein the sequence changes by 5 carriers with each combination, wherein the sequence of carriers produces a family of available cyclic prefix overheads in N×1.33% steps.

12. An apparatus configured for wireless communication, comprising:
   means for selecting a cyclic prefix overhead for orthogonal division multiple access (OFDMA) symbols to be transmitted in a broadcast, wherein the cyclic prefix overhead is determined based on an integer multiple of a standard carriers-to-resource blocks (RBs) definition, wherein the integer multiple comprises a number of carriers selected to result in an integer number of carriers relative to 300 carriers per 25 RBs;
   means for selecting a cyclic prefix duration for the OFDMA symbols, wherein the cyclic prefix duration is determined to result in an integer number of carriers per RB based on the integer multiple of the standard carriers-to-RBs definition, and wherein the selected number of carriers allows for the cyclic prefix duration to vary according to the number of carriers selected; and
   means for transmitting the OFDMA symbols using the cyclic prefix duration and cyclic prefix overhead.

13. The apparatus of claim 12, wherein the integer multiple of the standard carriers-to-RBs definition is determined based on a fractional cyclic prefix having a denominator of 180.

14. The apparatus of claim 13, wherein the means for selecting the total duration comprises:
   means for selecting a desired duration including a symbol duration and one of plurality of cyclic prefix durations, wherein the selected desired duration results in the integer number of carriers per RB.

15. The apparatus of claim 12, wherein the means for selecting the cyclic prefix duration comprises:
   means for selecting a desired duration including a symbol duration and one of plurality of cyclic prefix durations, wherein the selected desired duration results in the integer number of carriers per RB.

16. A non-transitory computer-readable medium having program code recorded thereon, the program code comprising:
   program code for causing a computer to select a cyclic prefix overhead for orthogonal division multiple access (OFDMA) symbols to be transmitted in a broadcast, wherein the cyclic prefix overhead is determined based on an integer multiple of a standard carriers-to-resource blocks (RBs) definition, wherein the integer multiple comprises a number of carriers selected to result in an integer number of carriers relative to 300 carriers per 25 RBs;
   program code for causing the computer to select a cyclic prefix duration for the OFDMA symbols, wherein the cyclic prefix duration is determined to result in an integer number of carriers per RB based on the integer multiple of the standard carriers-to-RBs definition, and wherein the selected number of carriers allows for the cyclic prefix duration to vary according to the number of carriers selected; and
   program code for causing the computer to transmit the OFDMA symbols using the cyclic prefix duration and cyclic prefix overhead.

17. The non-transitory computer-readable medium of claim 16, wherein the integer multiple of the standard carriers-to-RBs definition is determined based on a fractional cyclic prefix having a denominator of 180.

18. The non-transitory computer-readable medium of claim 17, wherein the program code for causing the computer to select the total duration comprises:
   program code for causing the computer to select a desired duration including a symbol duration and one of plurality of cyclic prefix durations, wherein the selected desired duration results in the integer number of carriers per RB.

19. The non-transitory computer-readable medium of claim 16, wherein the program code for causing the computer to select the cyclic prefix duration comprises:
   program code for causing the computer to select a desired duration including a symbol duration and one of plurality of cyclic prefix durations, wherein the selected desired duration results in the integer number of carriers per RB.

20. An apparatus configured for wireless communication, the apparatus comprising:
   at least one processor; and
   a memory coupled to the at least one processor,
   wherein the at least one processor is configured:
      to select a cyclic prefix overhead for orthogonal division multiple access (OFDMA) symbols to be transmitted in a broadcast, wherein the cyclic prefix overhead is determined based on an integer multiple of a standard carriers-to-resource blocks (RBs) definition, wherein the integer multiple comprises a number of carriers selected to result in an integer number of carriers relative to 300 carriers per 25 RBs;
      to select a cyclic prefix duration for the OFDMA symbols, wherein the cyclic prefix duration is determined to result in an integer number of carriers per RB based on the integer multiple of the standard carriers-to-RBs definition, and wherein the selected number of carriers allows for the cyclic prefix duration to vary according to the number of carriers selected; and
      to transmit the OFDMA symbols using the cyclic prefix duration and cyclic prefix overhead.

21. The apparatus of claim 20, wherein the integer multiple of the standard carriers-to-RBs definition is determined based on a fractional cyclic prefix having a denominator of 180.

22. The apparatus of claim 21, wherein the integer number of carriers per RB is determined according to the formula:
   number of carriers per RB=180,000 (Hz)×total duration (s) (1−fractional cyclic prefix), where 180,000 (Hz) represents bandwidth of a RB, and the total duration (in seconds) represents a sum of an OFDMA symbol time and the cyclic prefix duration.

23. The apparatus of claim 21, wherein the fractional cyclic prefix is determined according to the formula:

fractional cyclic prefix=$N$/180, where $N$ represents an integer value.

24. The apparatus of claim 21, wherein the configuration of the at least one processor to select the total duration comprises configuration to select a desired duration including a symbol duration and one of plurality of cyclic prefix durations, wherein the selected desired duration results in the integer number of carriers per RB.

25. The apparatus of claim 20, wherein the configuration of the at least one processor to select the cyclic prefix duration comprises configuration to select a desired duration including a symbol duration and one of plurality of cyclic prefix durations, wherein the selected desired duration results in the integer number of carriers per RB.

26. The apparatus of claim 20, wherein the integer multiple comprises a sequence of carriers between 370 carriers and 300 carriers, wherein the sequence changes by 5 carriers with each combination, wherein the sequence of carriers produces a family of available cyclic prefix overheads in N×1.33% steps.

* * * * *